US010118510B2

(12) United States Patent
McRoberts et al.

(10) Patent No.: US 10,118,510 B2
(45) Date of Patent: Nov. 6, 2018

(54) IMPACT PROTECTION FOR CHILD CAR SEAT (71) Applicant: Evenflo Company, Inc., Miamisburg, OH (US)

(72) Inventors: Jason McRoberts, Liberty Township, OH (US); Andrew R. Davis, Huber Heights, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 119 days.

(21) Appl. No.: 15/366,901

(22) Filed: Dec. 1, 2016

(65) Prior Publication Data
US 2017/0151894 A1 Jun. 1, 2017

Related U.S. Application Data (60) Provisional application No. 62/261,608, filed on Dec. 1, 2015.

(51) Int. Cl.
B60N 2/42 (2006.01)
B60N 2/28 (2006.01)
B60N 2/80 (2018.01)
B60N 2/809 (2018.01)
B60N 2/888 (2018.01)
B60N 2/427 (2006.01)

(52) U.S. Cl.
CPC ......... B60N 2/2884 (2013.01); B60N 2/2851 (2013.01); B60N 2/4235 (2013.01); B60N 2/42709 (2013.01); B60N 2/809 (2018.02); B60N 2/888 (2018.02)

(58) Field of Classification Search
CPC .... B60N 2/42; B60N 2/4235; B60N 2/42709; B60N 2/2851; B60N 2/2884; B60N 2/809; B60N 2/885; B60N 2/888
USPC ........................................ 297/216.11, 216.12
See application file for complete search history.

(56) References Cited

U.S. PATENT DOCUMENTS

| 7,232,185 | B2 | 6/2007 | Hartenstine et al. | |
|---|---|---|---|---|
| 7,234,711 | B2 | 6/2007 | Gordon et al. | |
| 7,726,734 | B2 | 6/2010 | Mahal et al. | |
| 8,690,237 | B2 | 4/2014 | Allen | |
| 2004/0169406 | A1* | 9/2004 | Yoshida | B60N 2/2812 297/216.11 |
| 2009/0179469 | A1* | 7/2009 | Bass | B60N 2/882 297/216.12 |
| 2010/0026059 | A1* | 2/2010 | Amirault | B60N 2/2851 297/216.11 |
| 2010/0026064 | A1* | 2/2010 | Marsden | B60N 2/2866 297/250.1 |
| 2010/0295343 | A1* | 11/2010 | Marsden | B60N 2/2866 297/216.11 |
| 2010/0295344 | A1* | 11/2010 | Marsden | B60N 2/2884 297/216.11 |

(Continued)

FOREIGN PATENT DOCUMENTS

| CA | 2485759 | A1 * | 4/2005 | ........... B60N 2/2845 |
|---|---|---|---|---|
| DE | 4335778 | A1 * | 4/1995 | ............... A47C 7/38 |

(Continued)

Primary Examiner — Ryan D Kwiecinski
(74) Attorney, Agent, or Firm — Baker & Hostetler LLP (57) ABSTRACT A side impact protection device for a child car seat comprised of an energy absorbing element and an energy dispersing element.

6 Claims, 8 Drawing Sheets (56) References Cited

U.S. PATENT DOCUMENTS

| | | | | |
|---|---|---|---|---|
| 2010/0295345 A1* | 11/2010 | Marsden | ............... | B60N 2/2851 297/216.11 |
| 2010/0295346 A1* | 11/2010 | Marsden | ............... | B60N 2/2851 297/216.11 |
| 2010/0295347 A1* | 11/2010 | Marsden | ............... | B60N 2/2851 297/216.11 |
| 2012/0146369 A1* | 6/2012 | Gaudreau, Jr. | ....... | B60N 2/2809 297/216.11 |
| 2012/0175921 A1* | 7/2012 | Gaudreau, Jr. | ......... | B60N 3/101 297/183.1 |
| 2012/0306243 A1* | 12/2012 | Oltman | ................. | B60N 2/2884 297/216.11 |
| 2013/0093224 A1* | 4/2013 | Dainese | ................ | B60R 21/207 297/216.12 |
| 2013/0328368 A1* | 12/2013 | Allen | .................... | B60N 2/2851 297/250.1 |
| 2016/0001681 A1* | 1/2016 | Pos | ....................... | B60N 2/2851 297/216.11 |
| 2016/0039319 A1* | 2/2016 | Zhang | .................... | B60N 2/2851 297/216.11 |
| 2016/0193946 A1* | 7/2016 | Dillinger | ............... | B60N 2/4885 297/216.12 |
| 2017/0021745 A1* | 1/2017 | Oswald | ................. | B60N 2/2884 |
| 2017/0349065 A1* | 12/2017 | Pleiman | ................. | B60N 2/809 |

FOREIGN PATENT DOCUMENTS

| | | | | |
|---|---|---|---|---|
| EP | 1452406 A1 * | 9/2004 | ........... | B60N 2/2812 |
| FR | 2986194 A1 * | 8/2013 | ........... | B60N 2/2851 |
| JP | 2005001541 A * | 1/2005 | ........... | B60N 2/2851 |

* cited by examiner

IMPACT PROTECTION FOR CHILD CAR SEAT

TECHNICAL FIELD

The present disclosure relates to car seats. More particularly, the present disclosure relates to safety car seats having an impact protection device.

BACKGROUND

In the United States, child car seats are required by law for certain ages/sizes of children and recommended. There are many types of car seats available for purchase. Infant seats recommended for children under age 1 are typically rear-facing. Many include a base that is belted or tethered into the car and a seat that can latch into the base. The seat often includes a handle so that the seat may be carried when it is unlatched from the base (i.e., from the car). A popular car seat option for infants as well as children is a "convertible" car seat that may be oriented in a rear-facing position and the "converted" to a front-facing position. Some convertible car seats may even convert into a booster seat for children weighing up to 100 pounds. Typically the convertible car seats are strapped into the car using the car seat-belt, or are anchored to the car frame directly using a LATCH (Lower anchors and Tethers for children) system. Some car seats offer a harness for strapping the child into the seat. The usual harness is a five-point safety harness. The car seats tend to be formed from injection molded plastic, typically at least 5 mm thick, and the seats (with base in the case of the infant seats) typically weight 7 kgs or more.

Recently it has been found desirable to provide impact protection incorporated in car seats that absorb energy from a crash, accident, or other incidents that are directed from the side of the car seat. So far, there have been limited situations of manufacturers offering car seats having such protections, particularly through use of an additional energy-absorbing element incorporated in the side structure of the child safety seat.

Specifically, U.S. Pat. No. 7,234,711 discloses a side protective head restraint pad, pad assembly and safety seat. The restraint pad includes an air bladder with a pump for selectively inflating the air bladder and a release valve for selectively deflating the air bladder, an energy-absorbing component and a comfort component. A flexible enclosure is provided within which the air bladder, energy-absorbing component and comfort component are positioned in overlaid configuration to define a unit. The head restraint pad is adapted for being placed in a seat in lateral alignment with one side of the head of an occupant and inflated or deflated as appropriate to restrain the head against injurious lateral movement caused by a side impact relative to the seat.

In a different implementation of side impact protection for a child car seat, U.S. Pat. No. 7,232,185 discloses a head rest for a car seat used to transport a child in an automobile which is positionally adjustable vertically along the seat back on which the head rest is mounted. A latching mechanism is actuated by a button at the top of the head rest and includes a releasable latch engagable with the channels slidably supporting the support rails of the head rest. A retainer clip is mounted at the top of the channels to prevent the head rest from being separated from the seat back once assembled thereon. The head rest includes a pair of laterally spaced wings that are pivotally connected to the rear support portion of the headrest to be positionally adjustable relative to the child's head through an angular displacement of approximately 45 degrees. The pivot mechanism is operable to lock the wings in the selected positions.

Some additional general examples of implementations of the concept include the side impact devices disclosed in U.S. Pat. No. 8,690,237 entitled "Child car seat and headrest with side impact energy absorption" and U.S. Pat. No. 7,726,734 entitled "Juvenile seating with resilient side impact protection" as well devices that can be found in products marketed by such manufacturers as Maxi Cosi, Graco, and Britax.

However, none of these examples provides a child car seat having a relatively simple, non-static side impact protection device that is cheap to implement and provides the desired amount of energy absorption capabilities. Accordingly, it is desired to provide a child car seat having a relatively simple, non-static side impact protection device that is cheap to implement and provides the desired amount of energy absorption capabilities to the car seat.

SUMMARY

In accordance with the foregoing, the present disclosure comprises a car seat for an infant or child. The car seat may include a harness or may be a "booster" type car seat for which there is no harness or the harness is not used. In accordance with some aspects of the disclosure, the car seat may comprise a plastic shell or frame that is adapted to be strapped or anchored to the car frame. In other aspects, the disclosure may comprise a base that is adapted to be strapped to the car and the seat is adapted to be attached to the base. In yet other embodiments, such as booster embodiments, the car seat may not be strapped to the car.

In accordance with embodiments of the disclosure, the car seat may comprise a headrest portion or section of the car seat. The headrest may be integrally formed in the car seat or may be adjustable and comprise an independently movable section of the car seat. In accordance with the disclosure, the headrest section may have "wing" portions that extend outwardly from the back portion of the car seat to provide protection for the head of a child seated in the car seat. In particular, such wings may be particularly adapted to protect the head of a child from a side impact crash or collision.

In accordance with an aspect of the disclosure, an energy absorption system may be provided comprised of at least two separate energy absorbing materials layered together and including an energy dispersing arrangement. In accordance with aspects of this disclosure, the energy absorbing materials may comprise open cell foams, closed cell foams, EPS, etc. and the like. Also in accordance with this aspect of the disclosure, the energy dispersing arrangement may comprise an array of spikes formed of a relatively stiff material (such as plastic) and/or may comprise pylons or cones designed to include a "crush zone" to aid in both dispersion and absorption of potential impact energy. In yet other embodiments of the disclosure, the energy dispersing arrangement may be molded into the energy absorbing materials.

In accordance with other aspects of the disclosure, a housing may be provided for housing/containing an energy absorbing foam/material. The housing may be made of a relatively stiff material, such as plastic and may include a flange thereon. Accordingly, the housing may be retained by a cap or bezel such that the housing may move inwardly but outward movement of the housing is prevented by the flange around the housing being caught by the bezel or cap.

Other aspects of the invention may be apparent to those of ordinary skill with review of the attached drawings, appended claims and additional description.

BRIEF DESCRIPTION OF THE DRAWINGS

The above-mentioned and other features of the disclosure may be clarified by reference to the following description taken in conjunction with the accompanying drawings, wherein.

DETAILED DESCRIPTION

Figure 3:
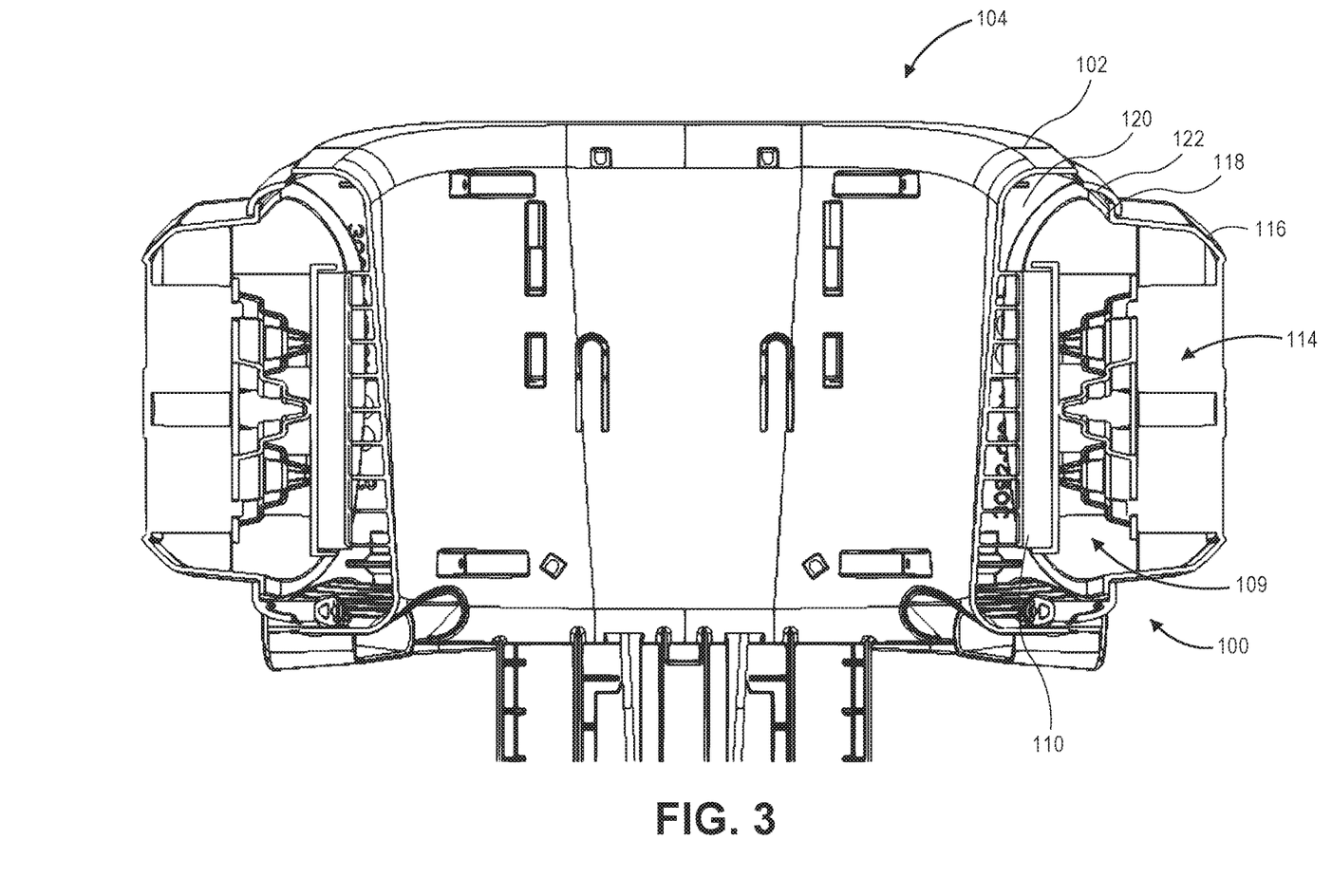
FIG. 3 is a side elevation, cutaway view of the energy absorbing structure of FIG. 2.
Figure 4:
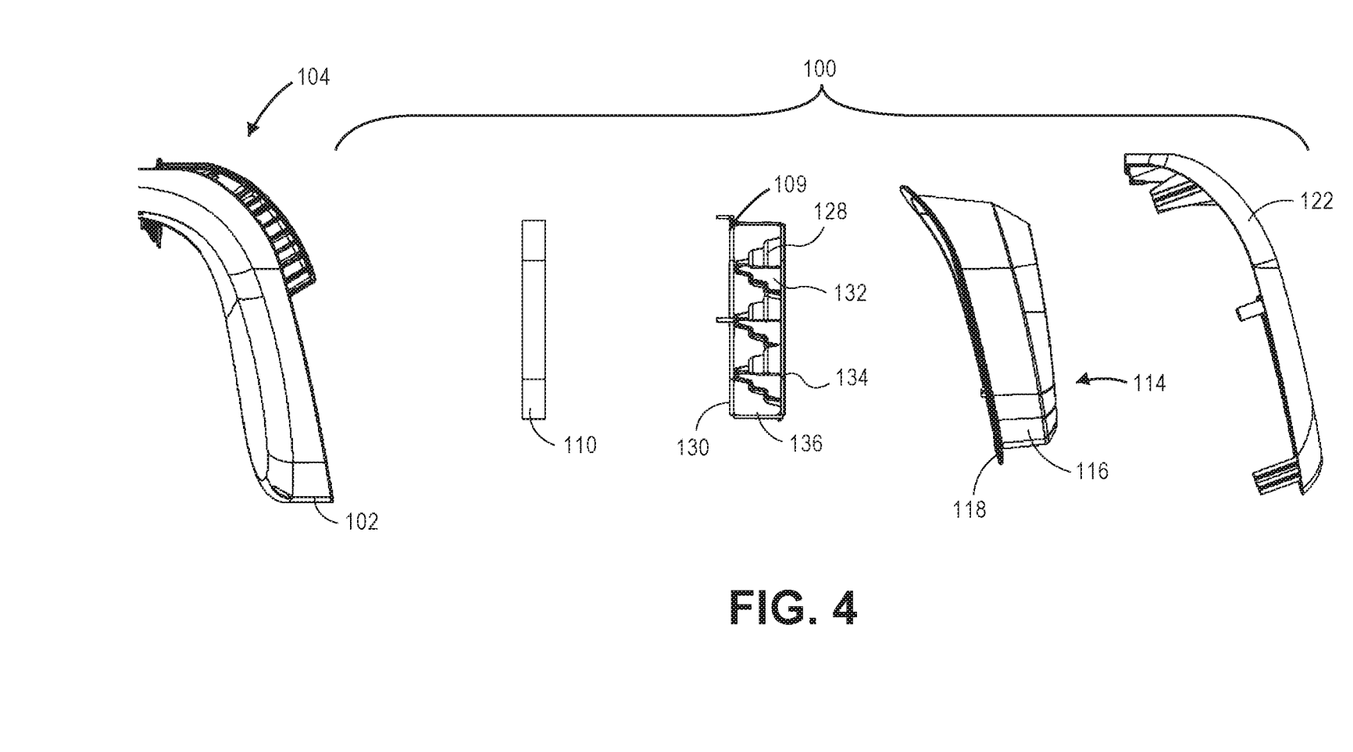
FIG. 4 is an exploded view of the energy absorbing structure of FIG. 2.

In accordance with aspects of the disclosure, an embodiment is disclosed in various levels of specificity in FIGS. 1-6. In particular, the present disclosure as seen generally in FIGS. 1-4 may generally comprise an energy absorbing structure 100. The energy absorbing structure 100 may be incorporated into an aspect of a car seat 10 (see, e.g. FIG. 1), such as a wing portion 102 of a headrest 104. As best shown in FIGS. 3 and 4, the energy absorbing structure 100 may be comprised of at least one energy absorbing element 110 comprised of some type of foam (open cell or closed cell), EPS, etc. Alternatively, the energy absorbing element 110 may comprise multiple layers of different energy absorbing materials.

Figure 5:
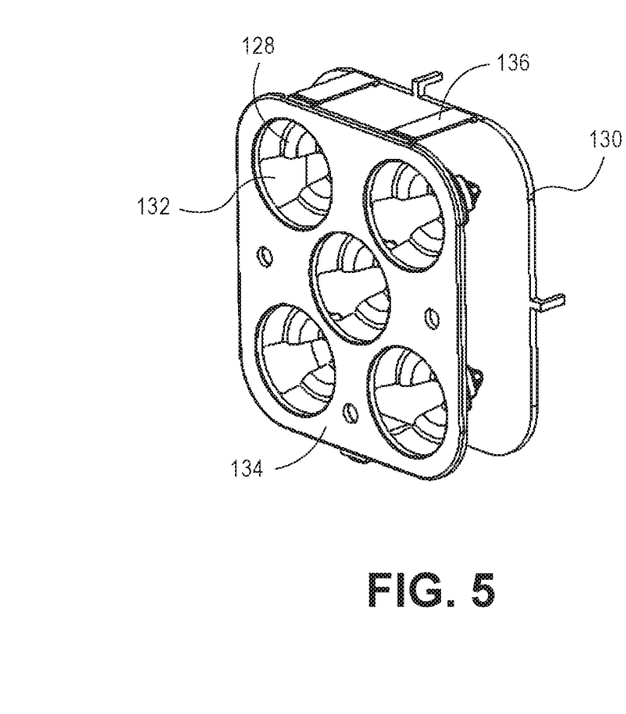
FIG. 5 is a side perspective view of a portion of an energy absorbing structure in accordance with FIG. 2.
Figure 6:
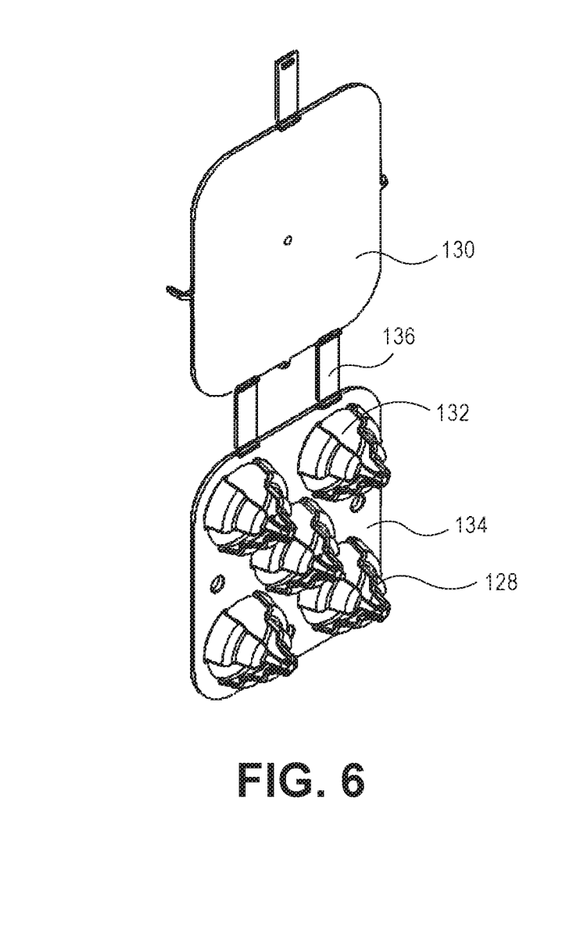
FIG. 6 is a side perspective view of a portion of an energy absorbing structure in accordance with FIG. 2.

In accordance with this embodiment a separate energy dispersing element 109 may be provided in addition to the energy absorbing element 110. The energy dispersing element 109 may be designed to both absorb and disperse kinetic energy. In accordance therewith, as best seen in FIGS. 5 and 6, the energy dispersing element may be comprised of crush elements 128 and a crush plate 130. The crush elements 128 may be of any desired shape include conical, pyramidal, box-shaped, etc. In order to facilitate energy dispersing through the "crushing" of the crush elements 128, the crush elements 128 may have cut-outs 132 or voids. The crush elements 128 may be positioned on or formed in a crush element plate 134. In accordance with embodiments of the disclosure, the crush plate 130 and crush element plate 134 may be attached by spacers 136 that are hingedly attached at one end to the crush plate 130 and on the other end to the crush element plate 134. The spacers 136 may generally correlate in height to the height of the crush elements 128. It should be noted that while the drawings depict crush elements of generally identical structure and height, the invention disclosed is not limited to such embodiment and encompasses embodiments having crush elements of many different structures, heights, shapes, etc.

The energy absorbing material 110 and energy dispersing element 109 may be located in a housing 114 comprising a body 116 and a flange 118. The housing 114 may be mounted for sliding movement within a recess 120. Depending on the structure and/or application in which the energy absorbing structure 100 is used, the recess 120 may be integrally formed in the structure, such as the wing portion 102 of the headrest 104 or may be formed as a separate unit. A cap 122 may be mounted over the recess 120 thereby trapping the flange 118 of the housing 114 and preventing outward movement thereof while allowing sliding inward movement. The housing 114 is preferably formed of a relatively inflexible material, such as plastic, in order that an impact on the outer surface of the housing 114 disperses forces generally uniformly to the energy absorbing materials 110 and energy dispersing element 109 located therein.

Figure 7:
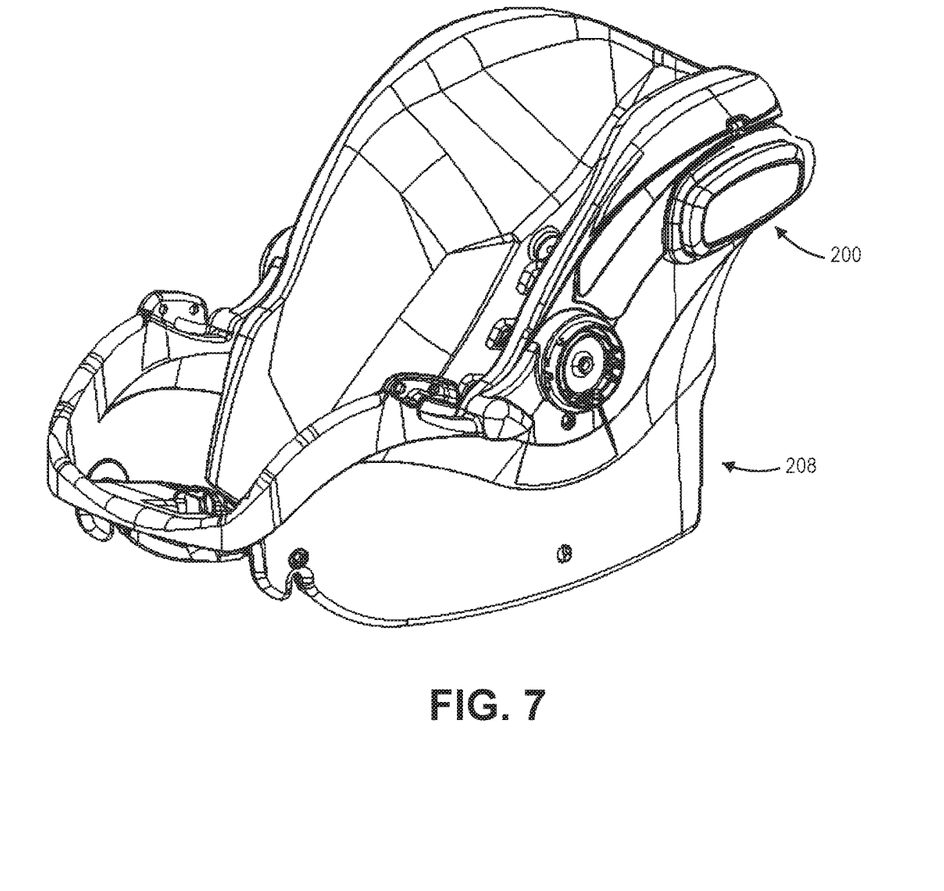
FIG. 7 is a side perspective view of a car seat incorporating an alternate embodiment of a side impact energy absorbing structure in accordance with aspects of the disclosure.
Figure 8:
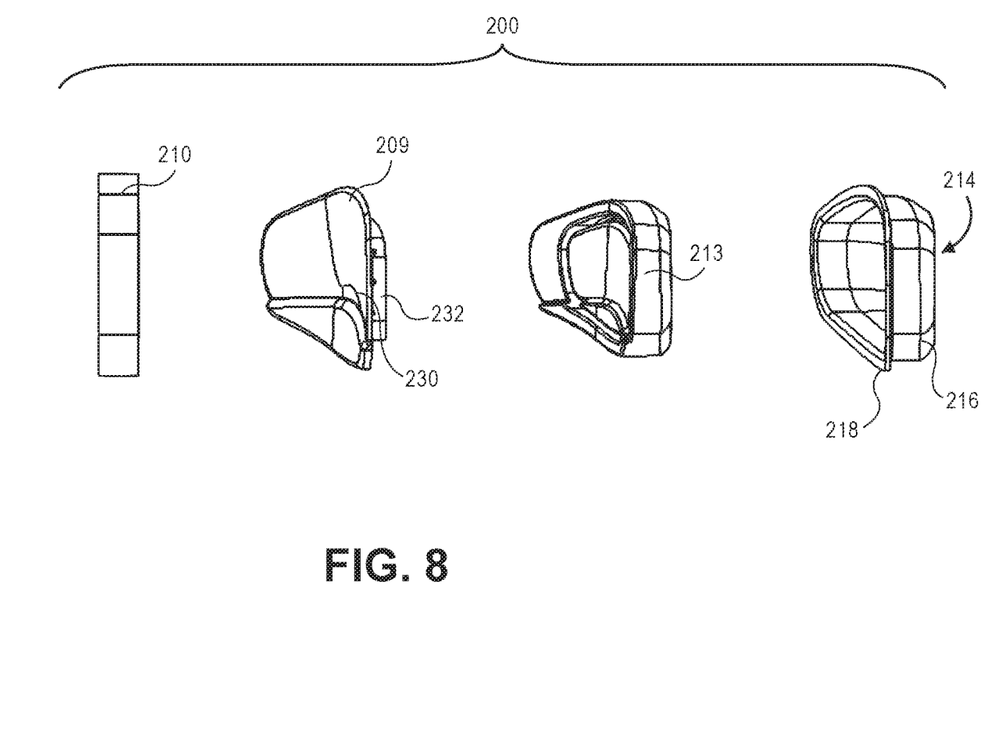
FIG. 8 is an exploded view of the energy absorbing structure shown in FIG. 7.
Figure 9:
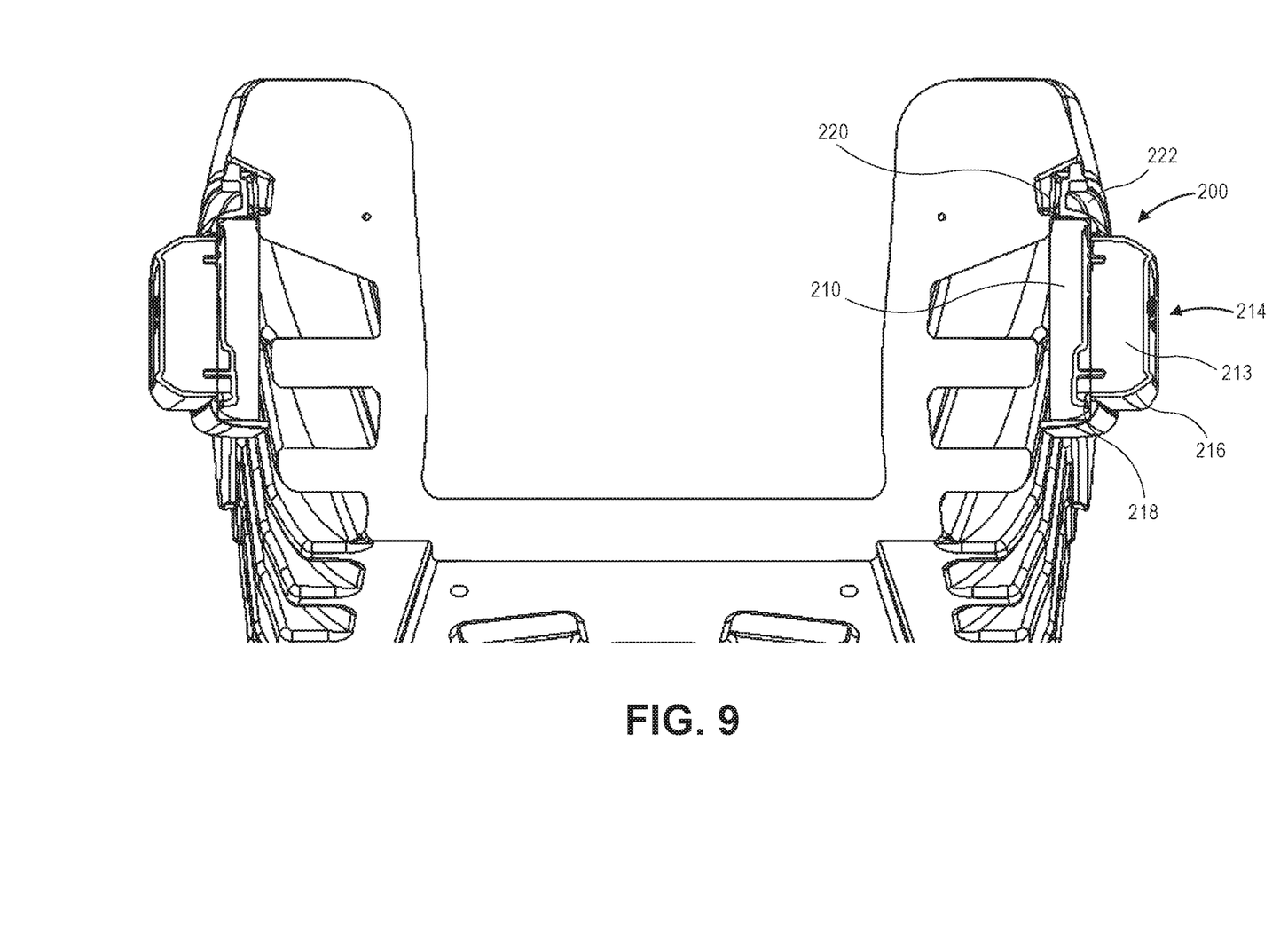
FIG. 9 a side elevation, cutaway view of the energy absorbing structure of FIG. 8.

As best shown in FIGS. 7, 8, and 9, an alternate embodiment of the present disclosure is illustrated. Specifically, in this embodiment, the energy absorbing structure 200 may be incorporated in an infant car seat 208 and may be comprised of at least two energy absorbing elements 210, 213 comprised of some type of foam (open cell or closed cell), EPS, etc. Alternatively, the energy absorbing element 210, 213 may comprise multiple layers of different energy absorbing materials.

In accordance with this embodiment a separate energy dispersing element 209 may be provided in between the energy absorbing elements 210, 213. The energy dispersing element 209 may be designed to both absorb and disperse kinetic energy. In accordance therewith, the energy dispersing element 209 may be comprised of a plate section 230 and a protrusion 232 shaped to be received in a portion of the energy absorbing element 213. It should be noted that while the drawings depict the energy dispersing element 209 as having a protrusion that is received by the energy absorbing element 213, the invention disclosed is not limited to such embodiment and encompasses embodiments wherein the protrusion extends into energy absorbing element 210 and may be of various different configurations, structures, shapes, etc.

The energy absorbing elements 210, 213 and energy dispersing element 209 may be located in a housing 214 comprising a body 216 and a flange 218. The housing 214 may be mounted for sliding movement within a recess 220. Depending on the structure and/or application in which the energy absorbing structure 200 is used, the recess 220 may be integrally formed in an upper portion 204 of the car seat 20 or may be formed as a separate unit. A cap 222 may be mounted over the recess 220 thereby trapping the flange 218 of the housing 214 and preventing outward movement thereof while allowing sliding inward movement. The housing 214 is preferably formed of a relatively inflexible material, such as plastic, in order that an impact on the outer surface of the housing 214 disperses forces generally uniformly to the energy absorbing materials 210, 213 located therein.

Figure 1:
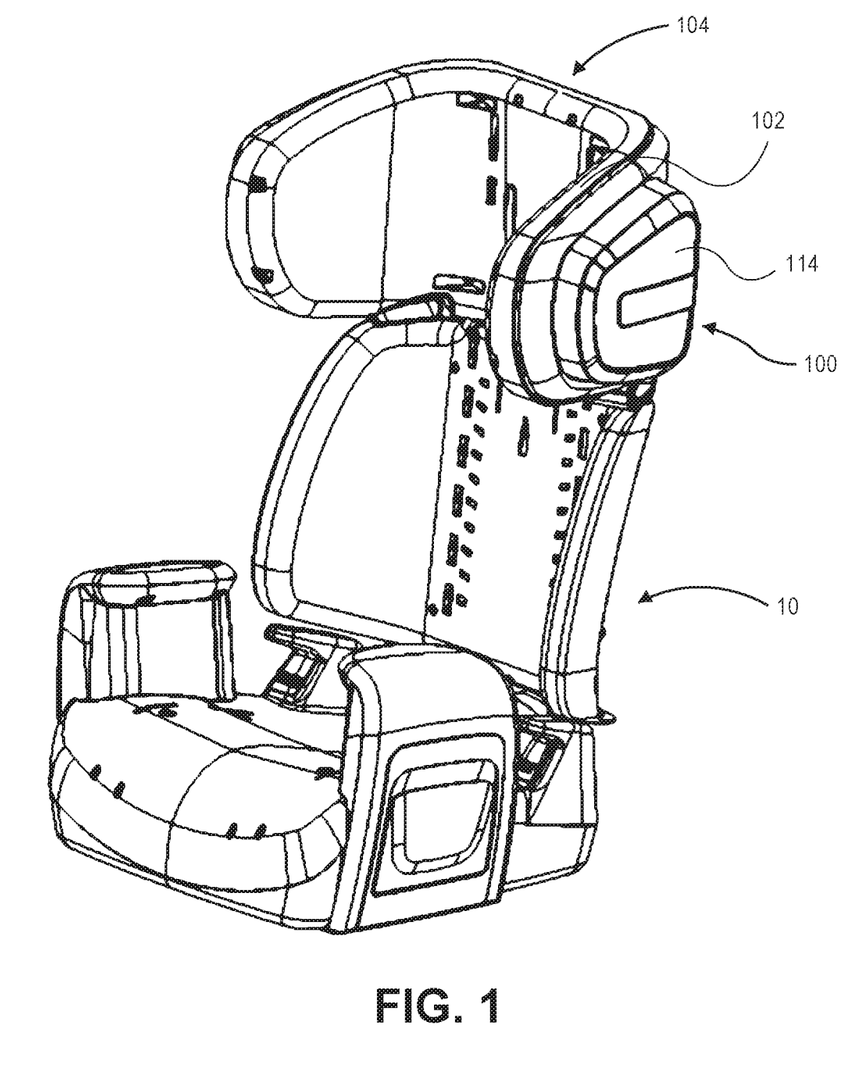
FIG. 1 is a side perspective view of a car seat incorporating a side impact energy absorbing structure in accordance with the disclosure.
Figure 2:
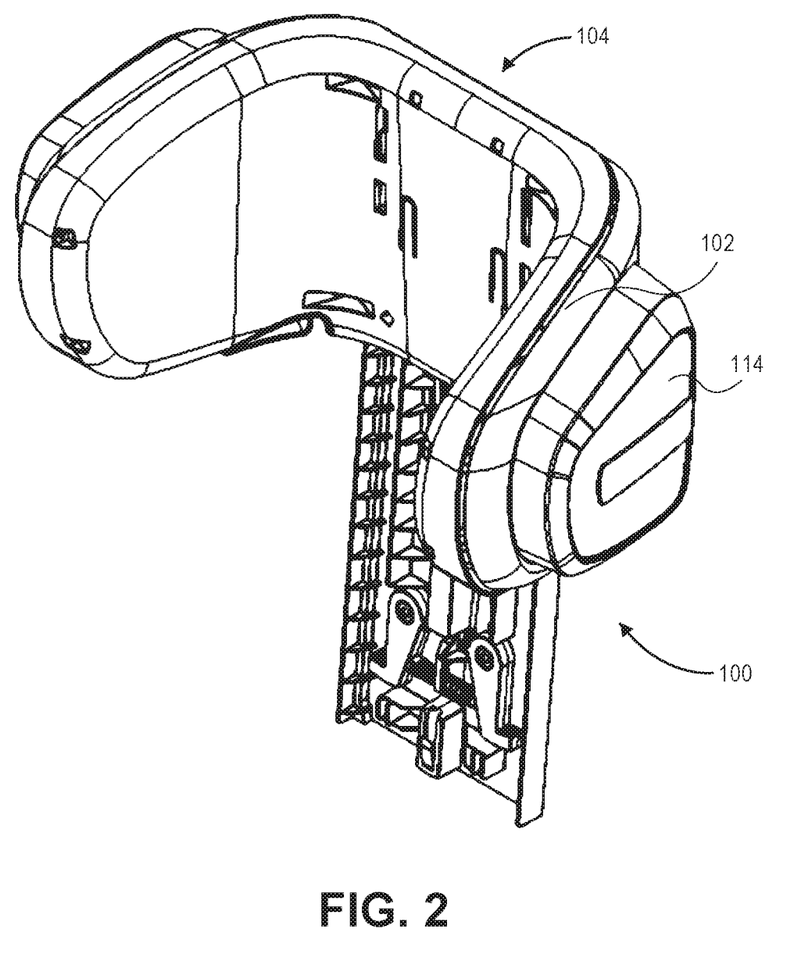
FIG. 2 is a side perspective view of the side impact energy absorbing structure shown in FIG. 1.

As best shown in FIGS. 1 and 7, the energy absorbing structure 100, 200 may be incorporated into a car seat 10, 20. The energy absorbing structure 100, 200 may be incorporated anywhere therein. Non-limiting examples include in or on the side portion 212 of the seat 210 and/or in or on the wing portion 104 of the headrest 102. Alternatively, energy absorbing structure 100, 200 of the present disclosure may be modular and removable from the car seat 10, 20.

There have been described and illustrated herein several embodiments of a car seat. While particular embodiments have been described, it is not intended that the claims be limited thereto, as it is intended that the claims be as broad in scope as the art will allow and that the specification be read likewise. Thus, while particular materials for use in connection with the disclosed energy absorbing structure have been disclosed, it will be appreciated that other materials may be used as well provided they supply sufficient energy absorbing and/or energy dissipating characteristics. It will therefore be appreciated by those skilled in the art that yet other modifications could be made without deviating from the spirit and scope of the disclosure.

What is claimed is:

1. A child car seat comprising:
   a headrest portion;
   an energy absorbing structure incorporated into the headrest portion, the energy absorbing structure including at least two separate energy absorbing elements and an energy dispersing element and being mounted inside a housing mounted for sliding movement with respect to the headrest portion;
   wherein the energy absorbing elements are separated by the energy dispersing element, the energy dispersing element is comprised of a plate and a protrusion, and at least one of the energy absorbing elements includes a relief portion to receive the protrusion.

2. The child car seat of clam 1 wherein the energy absorbing elements are comprised of an open cell foam, a closed cell foam, or expanded polystyrene.

3. The child car seat of claim 1 wherein the energy absorbing structure includes a housing for housing the energy absorbing elements and the energy dispersing element.

4. The child car seat of claim 3 wherein the housing includes a body portion and a flange portion and the flange portion is shaped to engage a portion of a cap positioned thereover to prevent outward movement thereof.

5. The child car seat of clam 1 wherein the headrest portion includes at least one wing portion and the energy absorbing structure is mounted on the at least one wing portion.

6. The child car seat of claim 1 wherein the energy dispersing element is comprised of at least one crush element.

* * * * *